United States Patent
Yasunaga et al.

(10) Patent No.: US 12,181,082 B2
(45) Date of Patent: Dec. 31, 2024

(54) RESIN TUBE CONNECTION DEVICE

(71) Applicant: SHIMADZU CORPORATION, Kyoto (JP)

(72) Inventors: Kenichi Yasunaga, Kyoto (JP); Shinji Tanaka, Kyoto (JP); Jun Yanagibayashi, Kyoto (JP); Ryo Hosono, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 18/007,805

(22) PCT Filed: Mar. 2, 2021

(86) PCT No.: PCT/JP2021/008010
§ 371 (c)(1),
(2) Date: Dec. 2, 2022

(87) PCT Pub. No.: WO2021/250948
PCT Pub. Date: Dec. 16, 2021

(65) Prior Publication Data
US 2023/0272870 A1 Aug. 31, 2023

(30) Foreign Application Priority Data
Jun. 9, 2020 (JP) ................. 2020-100455

(51) Int. Cl.
*F16L 21/04* (2006.01)
*G01N 30/60* (2006.01)

(52) U.S. Cl.
CPC .......... *F16L 21/04* (2013.01); *G01N 30/6034* (2013.01)

(58) Field of Classification Search
CPC ..... F16L 9/14; F16L 9/147; F16L 9/02; F16L 9/22; F16L 23/00; F16L 19/02;
(Continued)

(56) References Cited

U.S. PATENT DOCUMENTS

2012/0024411 A1* 2/2012 Hahn ................. G01N 30/6073
138/140
2014/0131997 A1* 5/2014 Burger .............. G01N 30/6039
285/285.1
(Continued)

FOREIGN PATENT DOCUMENTS

JP 2014-098694 A 5/2014
JP 5755704 B2 7/2015
(Continued)

OTHER PUBLICATIONS

International Search Report for corresponding Application No. PCT/JP2021/008010, mailed May 25, 2021.
(Continued)

*Primary Examiner* — Aaron M Dunwoody
(74) *Attorney, Agent, or Firm* — Renner, Otto, Boisselle & Sklar, LLP

(57) ABSTRACT

A resin tube connection device includes a resin tube, a resin expanding portion and a metal sleeve. The resin expanding portion has a sealing surface being able to come into contact with a contact surface. Further, the resin expanding portion has a second flow path that communicates with a first flow path of the resin tube and opens in the sealing surface. The sealing surface projects farther than an end surface of the metal sleeve in an axial direction. The maximum length of a contact region where the resin expanding portion and the metal sleeve come into contact with each other in the axial direction in an outer surface is larger than the thickness of a resin layer in a radial direction.

10 Claims, 5 Drawing Sheets

(58) Field of Classification Search
CPC ..... F16L 19/0243; F16L 19/025; F16L 19/04; F16L 19/05; F16L 19/055; F16L 21/04; F16L 21/02; G01N 30/6034; G01N 30/6039; G01N 30/6043
See application file for complete search history.

(56) References Cited

U.S. PATENT DOCUMENTS

| | | |
|---|---|---|
| 2016/0116088 A1 | 4/2016 | Graham et al. |
| 2016/0305586 A1 | 10/2016 | Graham et al. |
| 2017/0122918 A1 | 5/2017 | Wachinger et al. |
| 2017/0268704 A1 | 9/2017 | Graham et al. |
| 2017/0276275 A1 | 9/2017 | Beemer et al. |
| 2020/0292108 A1 | 9/2020 | Graham et al. |
| 2022/0057032 A1 | 2/2022 | Beemer et al. |

FOREIGN PATENT DOCUMENTS

| | | |
|---|---|---|
| JP | 2017-531805 A | 10/2017 |
| WO | 2011/076244 A1 | 6/2011 |

OTHER PUBLICATIONS

Notice of Reasons for Refusal in corresponding Japanese Patent Application No. 2022-530026 dated Jan. 16, 2024, with English machine translation.
Written Opinion of the ISA for corresponding PCT Application No. PCT/JP2021-008010 mailed May 25, 2021.
English Translation of the Written Opinion of the ISA for corresponding PCT Application No. PCT/JP2021-008010 mailed May 25, 2021.

* cited by examiner

RESIN TUBE CONNECTION DEVICE

TECHNICAL FIELD

The present invention relates to a resin tube connection device.

BACKGROUND ART

For example, in a liquid chromatograph, a resin tube may be used in a case in which a sample that is likely to be adsorbed to metal is analyzed or a case in which a metal-corrosive mobile phase is used. The resin tube has the structure in which the inner surface of a metal pipe is covered by a resin layer, for example. In a case in which the resin tube is connected to a separation column, for example, it is necessary to ensure the sealability between the resin tube and a flow path of the separation column. Therefore, it is suggested that sealing structure is provided in the end surface of the resin tube. For example, Patent Document 1 describes a plug unit for coupling of a plug capillary for a high performance liquid chromatograph.

The plug unit has a plug capillary, a pressing body and a sealing member. The plug capillary has an outer cover portion made of a hard material and an inner cover portion made of an elastic material. The inner cover portion has an end region extending outwardly in a radial direction. The pressing body and the sealing member are provided so as to cover the outer peripheral surface of the plug capillary. A bush unit is arranged in the separation column. The bush unit is provided with an accommodating recess. The plug unit is screwed into the accommodating recess of the bush unit.

[Patent Document 1] JP 2014-098694 A

SUMMARY OF INVENTION

Technical Problem

With the plug unit of Patent Document 1, an abutment surface of the pressing body is pressed against the accommodating recess of the bush unit, and the end region is plastically deformed. Thus, a flow path in the plug capillary is sealed.

However, when a constituent such as the separation column is replaced, it is necessary to detach the plug capillary from the constituent by detaching the plug unit from the bush unit and then attach the plug capillary to a constituent after the replacement by screwing the plug unit into the bush unit. Repeated detachment and attachment of the plug capillary damages the end portion of the plug capillary.

An object of the present invention is to provide a resin tube connection device capable of preventing damage to a resin tube.

Solution to Problem

A resin tube connection device according to one aspect of the present invention connectable to a member which is to be connected and on which a contact surface having a flow-path hole is formed, includes a resin tube having a metal pipe, having a resin layer formed on an inner peripheral surface of the metal pipe and having a first flow path surrounded by the resin layer, a resin expanding portion that is formed of a same material as that of the resin tube and is integrally formed with the resin tube, and is provided so as to project in an axial direction from an end of the resin layer and project farther outwardly than the metal pipe in a radial direction of the resin tube, and a metal sleeve formed so as to cover an outer peripheral surface of the metal pipe and an outer surface of the resin expanding portion, wherein the resin expanding portion has a sealing surface being able to come into contact with the contact surface and has a second flow path communicating with the first flow path of the resin tube and opening in the sealing surface, the sealing surface projects farther than an end surface of the metal sleeve in the axial direction, and a maximum length of a contact region where the resin expanding portion and the metal sleeve are in contact with each other in the axial direction in the outer surface is larger than a thickness of the resin layer in the radial direction.

A resin tube connection device according to another aspect of the present invention connectable to a member which is to be connected and on which a contact surface having a flow-path hole is formed, includes a resin tube having a metal pipe, having a resin layer that is formed on an inner peripheral surface of the metal pipe and projects in an axial direction from an end surface of the metal pipe and having a flow path surrounded by the resin layer, a resin sealer that is joined to the resin layer so as to cover an outer peripheral surface of a portion of the resin layer projecting from the metal pipe, and a metal sleeve formed so as to cover an outer peripheral surface of the metal pipe and an outer surface of the resin sealer, wherein the resin sealer has a sealing surface being able to come into contact with the contact surface and has an opening communicating with the flow path of the resin tube, the sealing surface projects farther than an end surface of the metal sleeve in the axial direction, and a maximum length of a contact region where the resin sealer and the metal sleeve come into contact with each other in the axial direction is larger than a thickness of the resin layer in a radial direction.

Advantageous Effects of Invention

The present invention can provide a resin tube connection device capable of preventing damage to a resin tube.

DESCRIPTION OF EMBODIMENTS

A resin tube connection device according to embodiments of the present invention will be described below in detail with reference to the drawings.

(1) First Embodiment

Figure 1:
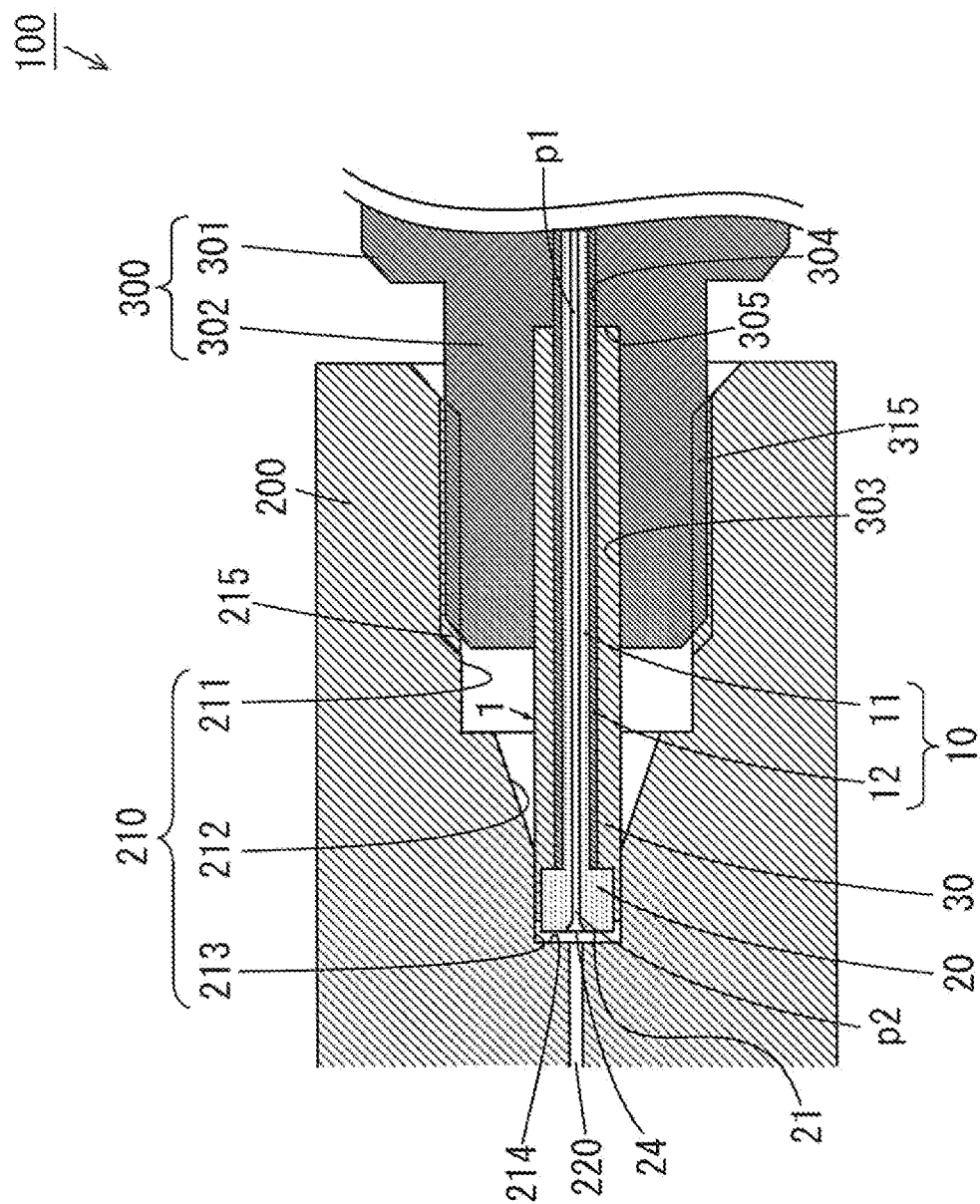
FIG. 1 is a schematic cross sectional view showing one example of a resin tube connection structure in which a resin tube connection device according to a first embodiment is used.

FIG. 1 is a schematic cross sectional view showing one example of a resin tube connection structure in which a resin tube connection device according to a first embodiment is used. As shown in FIG. 1, the resin tube connection structure 100 includes a resin tube connection device 1, a bushing 200 and a male nut 300. The bushing 200 is an example of a member which is to be connected.

The resin tube connection device 1 includes a resin tube 10, a resin expanding portion 20 and a metal sleeve 30. The resin tube 10 is constituted by a metal pipe 11 and a resin layer 12. The resin tube 10 is provided with a first flow path p1 surrounded by the resin layer 12. Hereinafter, one direction in an axial direction of the resin tube 10 is referred to as forward, and a direction opposite to the one direction is referred to as rearward.

The resin expanding portion 20 is formed integrally with the resin tube 10. The resin expanding portion 20 is provided with a second flow path p2 communicating with the first flow path p1. The resin expanding portion 20 has a sealing surface 21 orthogonal to 25 the axial direction. The second flow path p2 has an opening 24 in the sealing surface 21. The metal sleeve 30 is formed so as to cover the metal pipe 11 and the resin expanding portion 20.

The bushing 200 is formed with an accommodating recess 210 and a flow-path hole 220. The accommodating recess 210 includes a large-diameter portion 211, a tapered portion 212 and a small-diameter portion 213 in this order. A female screw portion 215 is formed on the inner peripheral surface of the large-diameter portion 211. The tapered portion 212 has an inner diameter that decreases gradually and forwardly from the front end of the large-diameter portion 211. The small-diameter portion 213 extends forwardly from the front end of the tapered portion 212. A contact surface 214 is formed at the front end of the small-diameter portion 213. The bushing 200 is formed with the flow-path hole 220 that penetrates the bushing 200 forwardly from the contact surface 214. In the present embodiment, the cross-sectional area of the flow-path hole 220 is smaller than the area (opening area) of the opening 24 of the resin expanding portion 20 in the sealing surface 21.

The male nut 300 has a fastening portion 301 and a projecting portion 302. The male nut 300 is formed with an attachment hole 303 and a through hole 304. The fastening portion 301 is a portion to which a force is applied when the male nut 300 is fastened. Further, the fastening portion 301 is formed so as to be heldable by a fastening tool such as a spanner and has a polygonal cross-sectional shape, for example. The outer peripheral surface of the projecting portion 302 is formed with a male screw portion 315 corresponding to the female screw portion 215 of the large-diameter portion 211 of the bushing 200. The attachment hole 303 extends rearwardly from the front end of the projecting portion 302. A bottom surface 305 is formed at the rear end of the attachment hole 303. The through hole 304 penetrates the male nut 300 rearwardly from the bottom surface 305.

The resin tube connection device 1 is accommodated in the attachment hole 303 of the male nut 300. The resin tube 10 is inserted into the through hole 304 of the male nut 300.

In this state, the projecting portion 302 of the male nut 300 is fitted into the accommodating recess 210 of the bushing 200, and a torque is applied to the fastening portion 301 of the male nut 300 by the fastening tool. Thus, the male nut 300 is screwed forwardly with the female screw portion 215 of the bushing 200 and the male screw portion 315 of the male nut 300 threadedly engaged with each other.

At this time, the rear end surface of the resin tube connection device 1 is in contact with the bottom surface 305 of the male nut 300. Thus, the resin tube connection device 1 moves forwardly, and the sealing surface 21 of the resin expanding portion 20 is pressed against the contact surface 214 of the bushing 200. In this state, the resin expanding portion 20 is plastically deformed, thereby sealing the gap between the flow-path hole 220 and the second flow path p2. As a result, a fluid flowing into the flow-path hole 220 of the bushing 200 is prevented from leaking into the accommodating recess 210.

Figure 2:
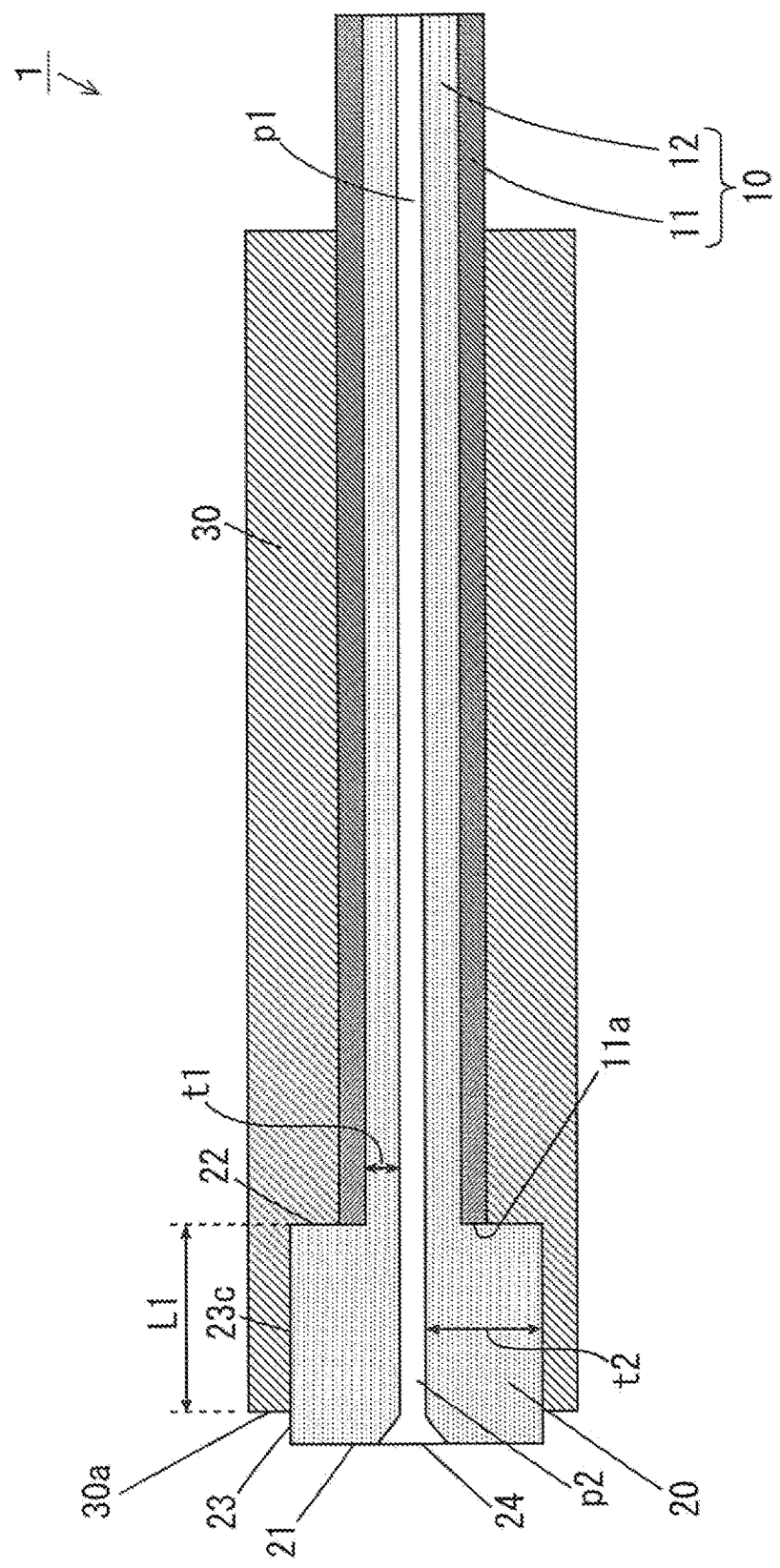
FIG. 2 is a schematic cross sectional view showing the configuration of the resin tube connection device according to the first embodiment.

FIG. 2 is a schematic cross sectional view showing the configuration of the resin tube connection device according to the first embodiment. The metal pipe 11 is formed of stainless, for example. The metal pipe 11 may be formed of another metal such as titanium, iron, copper or an alloy. An end surface 11a orthogonal to the axial direction is formed at the front end of the metal pipe 11. The resin layer 12 has a thickness t1 in a radial direction. The resin layer 12 is formed of PEEK (polyether ether ketone), for example. The resin layer 12 may be formed of another resin such as fluororesin. Further, the resin tube 10 is formed with the first flow path p1 surrounded by the resin layer 12. In the present embodiment, each of the metal pipe 11, the resin layer 12 and the first flow path p1 has a circular cross section.

The resin expanding portion 20 projects forwardly from the front end of the resin layer 12 and projects farther outwardly than the metal pipe 11 in the radial direction of the resin tube 10. The resin expanding portion 20 has a thickness t2 larger than the thickness t1 of the resin layer 12 in the radial direction. Further, the resin expanding portion 20 is formed of the same material as that of the resin layer 12 and integrally formed with the resin layer 12. For example, the resin layer 12 and the resin expanding portion 20 may be formed by thermoforming or may be formed by thermoforming and compression molding at room temperature.

In the present embodiment, the resin expanding portion 20 is formed in a columnar shape having a front end surface, a rear end surface 22 and an outer peripheral surface. The shape of the resin expanding portion 20 is not limited to a columnar shape and may be another shape such as a prismatic shape or a D-cut shape. The front end surface of the resin expanding portion 20 is the sealing surface 21, and the outer peripheral surface is an outer surface 23. In the present embodiment, each of the second flow path p2 and the opening 24 has a circular cross section. Further, in the present embodiment, the second flow path p2 has an inner diameter equal to that of the first flow path p1. In the present embodiment, the cross sectional area of the opening 24 gradually increases from the cross-sectional area of the second flow path p2. The inner diameter of the opening 24 in the sealing surface 21 is larger than the inner diameter of the first flow path p1. Thus, the opening area of the opening 24 is larger than the cross-sectional area of the first flow path p1. The outer surface 23 extends in the axial direction from the outer edge of the sealing surface 21 to the outer edge of the rear end surface 22 in the axial direction. The rear end surface 22 is located at the end surface 11a of the metal pipe 11.

The metal sleeve 30 is formed so as to cover the outer peripheral surface of the metal pipe 11 and the outer surface 23 of the resin expanding portion 20. The metal sleeve 30 is formed of stainless, for example. The metal sleeve 30 may be formed of another metal such as titanium, iron, copper or an alloy. An end surface 30a is formed at the front end of the metal sleeve 30.

The sealing surface 21 of the resin expanding portion 20 projects farther forwardly than the end surface 30a of the metal sleeve 30 in the axial direction. Thus, the end surface 30a of the metal sleeve 30 is located between the sealing surface 21 of the resin expanding portion 20 and the end surface 11a of the metal pipe 11 in the axial direction.

The region where the outer surface 23 of the resin expanding portion 20 and the metal sleeve 30 are in contact with each other is referred to as a contact region 23c. Further, the maximum length L1 of the contact region 23c in the axial direction is larger than the thickness t1 of the resin layer 12. In the present embodiment, because the resin expanding portion 20 is formed in a columnar shape, the maximum length L1 of the contact region 23c is equivalent to the distance between the end surface 11a of the metal pipe 11 and the end surface 30a of the metal sleeve 30.

In the resin tube connection device 1 according to the first embodiment, the maximum length L1 of the contact region 23c where the outer surface 23 of the resin expanding portion 20 are in contact with the metal sleeve 30 is larger than the thickness t1 of the resin layer 12. In this case, because the length of the resin expanding portion 20 in the axial direction is large, the resin expanding portion 20 is unlikely to be damaged even when a torsional torque is applied to the resin expanding portion 20. Further, because a large friction force is exerted between the contact region 23c of the outer surface 23 of the resin expanding portion 20 and the metal sleeve 30, the resin expanding portion 20 is firmly fixed to the metal sleeve 30. This suppresses torsion of the resin tube 10. Further, because the outer surface 23 of the resin expanding portion 20 is held by the metal sleeve 30, even when a compressive force is applied to the resin expanding portion 20 in the axial direction, the sealing surface 21 is prevented from expanding outwardly in the radial direction. Further, since the resin expanding portion 20 is formed in a pillar shape such as a columnar shape, durability of the resin expanding portion 20 is improved. As a result, when the resin tube connection device 1 is attached to the bushing 200, the resin tube 10 and the resin expanding portion 20 are prevented from being damaged.

Further, the opening area of the opening 24 of the resin expanding portion 20 is larger than the cross-sectional area of the flow-path hole 220 of the bushing 200. Therefore, when the sealing surface 21 of the resin expanding portion 20 is pressed against the contact surface 214, the peripheral edge of the opening 24 of the resin expanding portion 20 does not enter the flow-path hole 220. This prevents inward plastic deformation of the peripheral edge of the opening 24 of the resin expanding portion 20, so that the opening 24 of the resin expanding portion 20 is prevented from being closed. Further, because resin of the sealing surface 21 of the resin expanding portion 20 does not enter the flow-path hole 220 of the bushing 200, the sealing surface 21 of the resin expanding portion 20 is not pulled when the resin tube connection device 1 is detached. This prevents damage to the sealing surface 21 of the resin expanding portion 20.

While the outer surface 23 of the resin expanding portion 20 is formed to extend in the axial direction in the present embodiment, the outer surface 23 may be formed to extend in a curved shape from the outer edge of the sealing surface 21 to the end surface 11a of the metal pipe 11 without formation of the rear end surface 22. While having a circular cross section in the present embodiment, each of the metal pipe 11, the resin layer 12 and the first flow path p1 may have a cross section having another shape such as a polygonal shape or an oval shape.

While having a circular cross section, each of the second flow path p2 and the opening 24 may have a cross section having another shape such as a polygonal shape or an oval shape. Further, while having an inner diameter equal to that of the first flow path p1 in the present embodiment, the second flow path p2 may have a larger inner diameter or a smaller inner diameter than that of the first flow path p1.

(2) Second Embodiment

Figure 3:
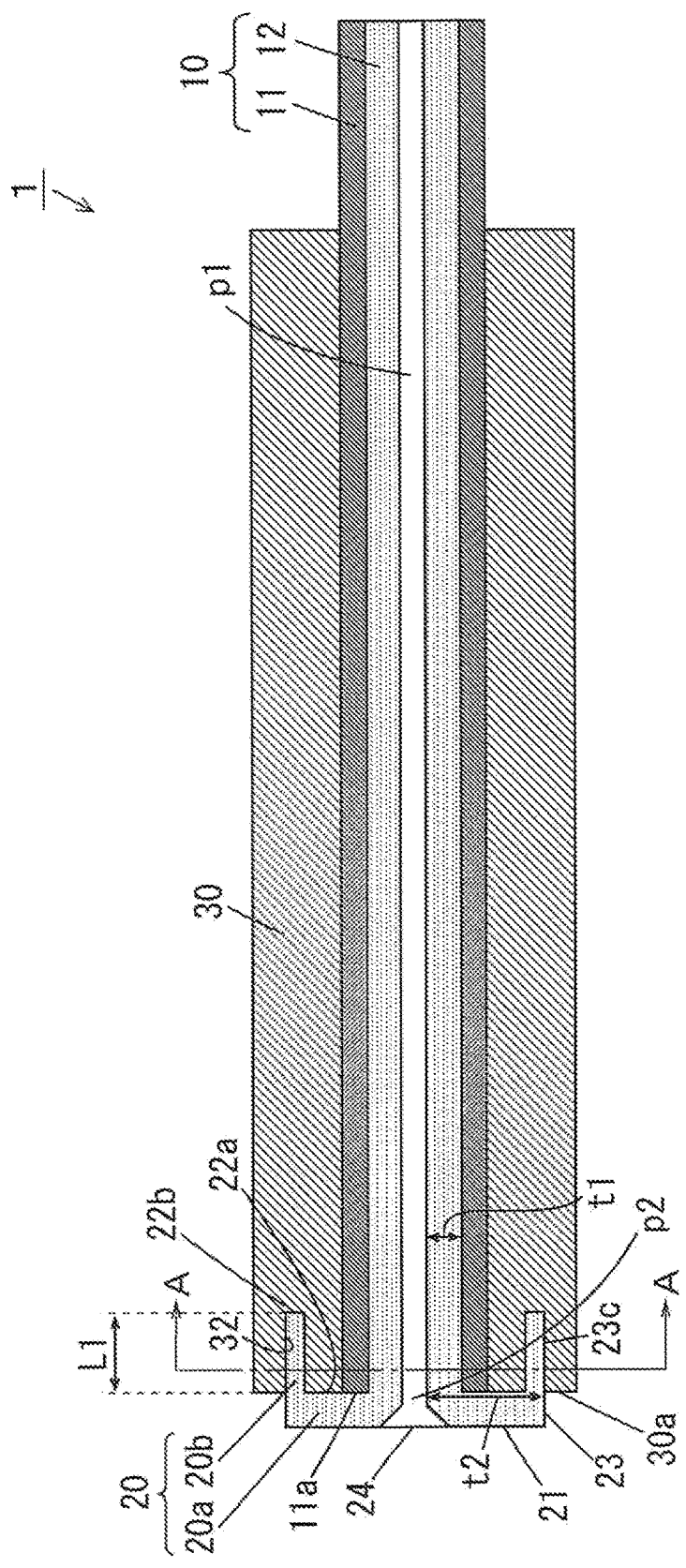
FIG. 3 is a schematic cross sectional view showing the configuration of a resin tube connection device according to a second embodiment.
Figure 4:
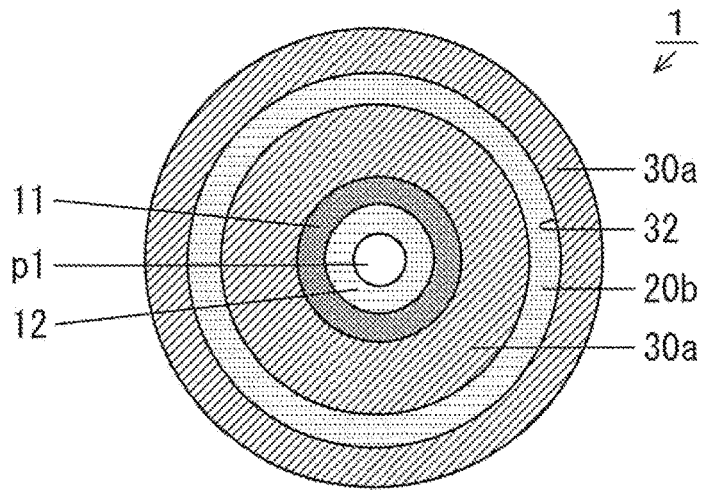
FIG. 4 is a cross sectional view taken along the line A-A of the resin tube connection device of FIG. 3.

FIG. 3 is a schematic cross sectional view showing a resin tube connection device according to a second embodiment. FIG. 4 is a cross sectional view taken along the line A-A of the resin tube connection device of FIG. 3. The resin tube connection device 1 of FIG. 3 is different from the resin tube connection device 1 of FIG. 2 in the following points.

An end surface 30a of a metal sleeve 30 is formed to be flush with an end surface 11a of a metal pipe 11. One or a plurality of recesses 32 are provided in the end surface 30a of the metal sleeve 30. In the present embodiment, the recess 32 has an annular shape surrounding a resin tube 10 as shown in FIG. 4.

As shown in FIG. 3, a resin expanding portion 20 includes an end-surface covering portion 20a and a fitting portion 20b. The end-surface covering portion 20a extends farther outwardly in a radial direction than the metal pipe 11 from a resin layer 12 and is formed on the end surface 11a of the metal pipe 11 and the end surface 30a of the metal sleeve 30. Thus, the end-surface covering portion 20a has a thickness t2 larger than a thickness t1 of the resin layer 12 in the radial direction. The end-surface covering portion 20a has a sealing surface 21.

The fitting portion 20b is formed to extend rearwardly from the outer periphery of the end-surface covering portion 20a. The fitting portion 20b is formed integrally with the end-surface covering portion 20a. In the present embodiment, as shown in FIG. 4, the fitting portion 20b has an annular cross section corresponding to the recess 32. Thus, the fitting portion 20b has a cylindrical shape. As shown in FIG. 3, an outer surface 23 of the end-surface covering portion 20a extends from the outer edge of the sealing surface 21 to a rear end surface 22b of the fitting portion 20b in the axial direction. The fitting portion 20b is fitted into the recess 32. Because the fitting portion 20b is fitted into the recess 32, a maximum length L1 of a contact region 23c of the outer surface 23 of the resin expanding portion 20 is equivalent the distance from an end surface 30a of the metal sleeve 30 to the bottom surface of the recess 32 in the axial direction (depth of the recess 32). The resin expanding portion 20 in the present embodiment is formed by ultrasonic processing, for example.

In the resin tube connection device 1 according to the second embodiment, the maximum length L1 of the contact region 23c of the resin expanding portion 20 is larger than the thicknesses t1 of the resin layer 12. In this case, because the length of the resin expanding portion 20 in the axial direction is large, the resin expanding portion 20 is unlikely to be damaged even when a torsional torque is applied to the resin expanding portion 20. Further, because the fitting portion 20b of the resin expanding portion 20 is fitted into the recess 32 of the metal sleeve 30, the outer surface 23 of the resin expanding portion 20 is held by the metal sleeve 30. In this case, because a large friction force is exerted between the contact region 23c of the outer surface 23 of the fitting portion 20b and the metal sleeve 30, the resin expanding portion 20 is firmly fixed to the metal sleeve 30. This suppresses torsion of the resin tube 10. Further, because the outer surface 23 of the resin expanding portion 20 is held by the metal sleeve 30, even when a compressive force is applied to the resin expanding portion 20 in the axial direction, the sealing surface 21 is prevented from expanding outwardly in the radial direction. As a result, the resin tube 10 and the resin expanding portion 20 are prevented from being damaged.

Further, the opening area of an opening 24 of the resin expanding portion 20 is larger than the cross-sectional area of a flow-path hole 220 of a bushing 200. Thus, similarly to the first embodiment, the opening 24 of the resin expanding portion 20 is prevented from being closed, and the sealing surface 21 of the resin expanding portion 20 is prevented from being damaged when the resin tube connection device 1 is detached.

Figure 5:
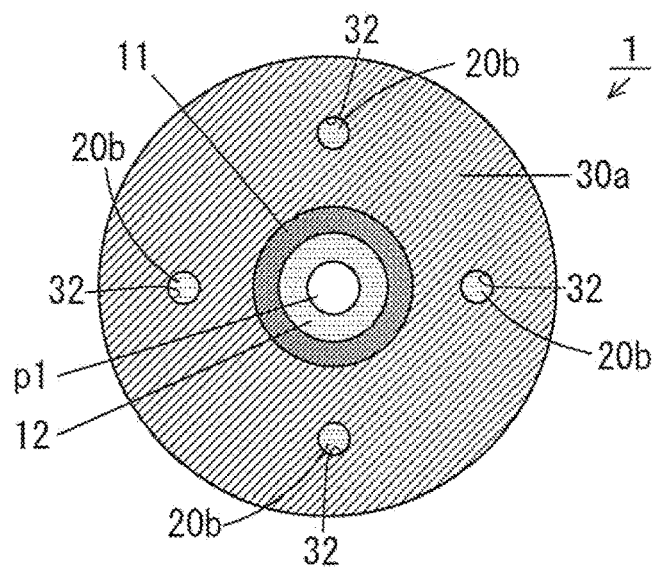
FIG. 5 is a cross sectional view showing another example of the configurations of a recess of a metal sleeve and a fitting portion of a resin expanding portion.
Figure 6:
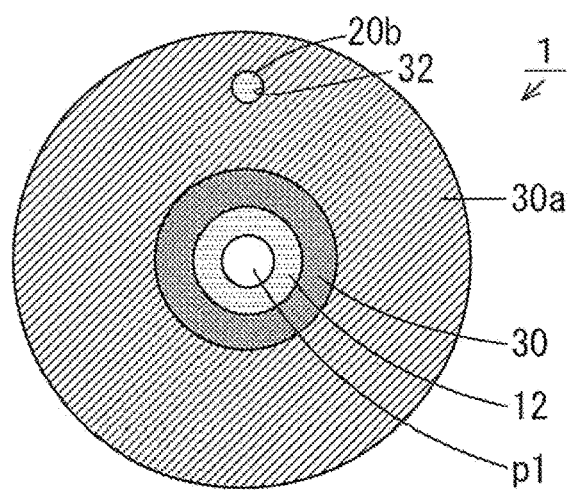
FIG. 6 is a cross sectional view showing yet another example of the configurations of the recess of the metal sleeve and the fitting portion of the resin expanding portion.

The configurations of the recess 32 of the metal sleeve 30 and the fitting portion 20b of the resin expanding portion 20 are not limited to the configurations of FIG. 4. FIG. 5 is a cross sectional view showing another example of the configurations of the recess 32 of the metal sleeve 30 and the fitting portion 20b of the resin expanding portion 20. FIG. 6 is a cross sectional view showing yet another example of the configurations of the recess 32 of the metal sleeve 30 and the fitting portion 20b of the resin expanding portion 20.

In the example of FIG. 5, a plurality of recesses 32 are formed in the end surface 30a of the metal sleeve 30. The resin expanding portion 20 has a plurality of fitting portions 20b that can be fitted into the plurality of recesses 32. The plurality of recesses 32 and the plurality of fitting portions 20b may be provided at a plurality of positions that are axially symmetric about the axial center of the resin tube 10, or may be provided at a plurality of any positions that are not axially symmetric. Further, the plurality of recesses 32 and the plurality of fitting portions 20b may be provided at equal intervals or may be provided at different intervals. The cross sectional shape of each recess 32 may be circular, polygonal, oval or another shape.

In the example of FIG. 6, one recess 32 is formed in the end surface 30a of the metal sleeve 30. The resin expanding portion 20 has one fitting portion 20b that can be fitted into the recess 32. The cross sectional shape of the recess 32 may be circular, oval, polygonal or another shape.

In both of the examples of FIGS. 5 and 6, the similar effect to that of the example of FIG. 4 can be obtained, and rotation of the resin expanding portion 20 with respect to the metal sleeve 30 can be reliably prevented.

(3) Third Embodiment

Figure 7:
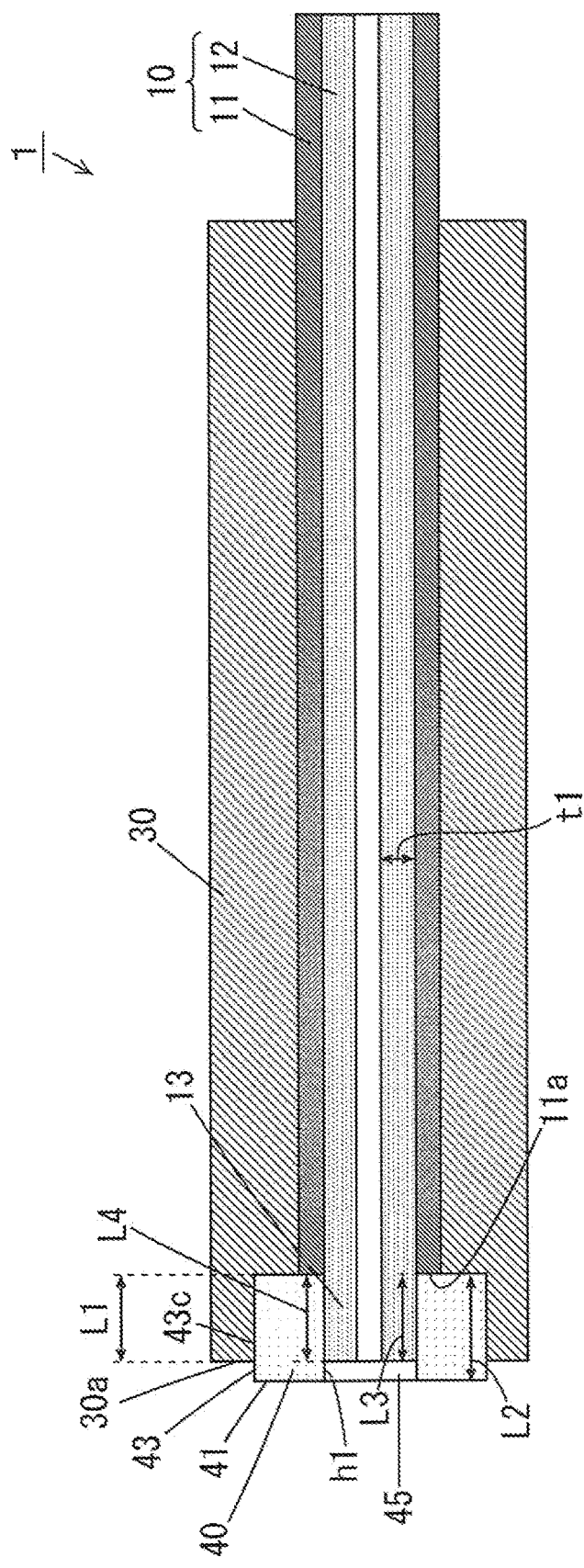
FIG. 7 is a schematic cross sectional view showing the configuration of a resin tube connection device according to a third embodiment.

FIG. 7 is a schematic cross sectional view showing a resin tube connection device according to a third embodiment. The resin tube connection device 1 of FIG. 7 is different from the resin tube connection device 1 of FIG. 2 in the following points.

The resin tube connection device 1 includes a resin sealer 40 instead of the resin expanding portion 20. The resin sealer 40 is a packing, for example. The resin sealer 40 is formed of PEEK (polyether ether ketone) separately from a resin layer 12, for example. The resin sealer 40 may be formed of another resin such as fluororesin. In the present embodiment, the resin sealer 40 is formed in a cylindrical shape having a front end surface, a rear end surface, an outer peripheral surface and an inner peripheral surface. Thus, a through hole h1 extending in an axial direction is formed in the resin sealer 40. The shape of the resin sealer 40 is not limited to a cylindrical shape and may be another shape such as a rectangular tube shape.

The front end surface of the resin sealer 40 is a sealing surface 41, and the outer peripheral surface of the resin sealer 40 is an outer surface 43. The outer surface 43 is formed to extend in the axial direction from the outer edge of the sealing surface 41 to the outer edge of the rear end surface. An inner peripheral surface 44 is formed to extend in the axial direction from the inner edge of the sealing surface 41 to the inner edge of the rear end surface. In this case, the resin sealer 40 has a length L2 in the axial direction.

The resin layer 12 formed on the inner peripheral surface of a metal pipe 11 has a portion projecting farther forwardly than an end surface 11a of the metal pipe 11. The portion of the resin layer 12 projecting farther than the end surface 11a of the metal pipe 11 is referred to as a resin-layer projecting portion 13. The resin-layer projecting portion 13 has a length L3 smaller than the length L2 of the resin sealer 40. The resin-layer projecting portion 13 is inserted into the through hole h1 of the resin sealer 40. Thus, the rear end surface of the resin sealer 40 comes into contact with the end surface 11a of the metal pipe 11.

At this time, since the length L2 of the resin sealer 40 is larger than the length L3 of the resin-layer projecting portion 13 of the resin tube 10, the sealing surface 41 of the resin sealer 40 projects farther forwardly than the end surface of the resin-layer projecting portion 13 in the axial direction. Thus, an opening 45 communicating with a first flow path p1 of the resin tube 10 is formed in the sealing surface 41. The opening area of the opening 45 is equivalent to the cross-sectional area of the through hole h1. In the present embodiment, the opening area of the opening 45 is larger than the cross-sectional area of the flow-path hole 220 of the bushing 200 of FIG. 1.

The outer peripheral surface of the resin-layer projecting portion 13 and the inner peripheral surface of the resin sealer 40 are bonded by thermal welding. The outer peripheral surface of the resin-layer projecting portion 13 and the inner peripheral surface of the resin sealer 40 may be bonded by an adhesive or the like.

The metal sleeve 30 is formed so as to cover the outer peripheral surface of the metal pipe 11 and the outer surface 43 of the resin sealer 40. An end surface 30a is formed at the front end of the metal sleeve 30. The sealing surface 41 of the resin sealer projects farther forwardly than the end surface 30a of the metal sleeve 30 in the axial direction. The region where the outer surface 43 of the resin sealer 40 and the metal sleeve 30 are in contact with each other is referred to as a contact region 43c. A maximum length L1 of the contact region 43c in the axial direction is larger than the thickness t1 of the resin layer 12.

In the resin tube connection device 1 according to the third embodiment, the resin layer 12 of the resin tube 10 and the resin sealer 40 are formed of a resin material. Thus, the resin layer 12 of the resin tube 10 and the resin sealer 40 are firmly fixed by thermal welding. Further, the maximum length L1 of the contact region 43c is larger than the thickness t1 of the resin layer 12. In this case, because the length of the resin sealer 40 in the axial direction is large, the resin sealer 40 is unlikely to be damaged even when a torsional torque is applied to the resin sealer 40.

Further, because a large friction force is exerted between the contact region 43c of the outer surface 43 of the resin sealer 40 and the metal sleeve 30, the resin sealer 40 is firmly fixed to the metal sleeve 30. This suppresses torsion of the resin tube 10. Further, because the outer surface 43 of the resin sealer 40 is held by the metal sleeve 30, even when a compressive force is applied to the resin sealer 40 in the axial direction, the sealing surface 41 is prevented from expanding outwardly in a radial direction. Further, since the resin sealer 40 is formed in a cylindrical shape, durability of the resin sealer 40 is improved. As a result, the resin tube 10 is prevented from being damaged.

Further, the opening area of the opening 45 of the resin sealer 40 is larger than the cross-sectional area of the flow-path hole 220 of the bushing 200. Thus, similarly to the first embodiment, the opening 45 of the resin sealer 40 is prevented from being closed, and the sealing surface 41 of the resin sealer 40 is prevented from being damaged when the resin tube connection device 1 is detached.

Further, the resin-layer projecting portion 13 of the resin layer 12 of the resin tube 10 is inserted into the through hole h1 of the resin sealer 40, and the inner peripheral surface 44 of the resin sealer 40 is bonded to the outer peripheral surface of the resin-layer projecting portion by thermal welding. In this case, the resin tube connection device 1 can be easily fabricated.

(4) Aspects

It is understood by those skilled in the art that the plurality of above-mentioned illustrative embodiments are specific examples of the below-mentioned aspects.

(Item 1) A resin tube connection device according to one aspect connectable to a member which is to be connected and on which a contact surface having a flow-path hole is formed may include a resin tube having a metal pipe, having a resin layer formed on an inner peripheral surface of the metal pipe and having a first flow path surrounded by the resin layer, a resin expanding portion that is formed of a same material as that of the resin tube and is integrally formed with the resin tube, and is provided so as to project in an axial direction from an end of the resin layer and project farther outwardly than the metal pipe in a radial direction of the resin tube, and a metal sleeve formed so as to cover an outer peripheral surface of the metal pipe and an outer surface of the resin expanding portion, wherein the resin expanding portion may have a sealing surface being able to come into contact with the contact surface and have a second flow path communicating with the first flow path of the resin tube and opening in the sealing surface, the sealing surface may project farther than an end surface of the metal sleeve in the axial direction, and a maximum length of a contact region where the resin expanding portion and the metal sleeve are in contact with each other in the axial direction in the outer surface may be larger than a thickness of the resin layer in the radial direction.

In the resin tube connection device according to item 1, the resin expanding portion that is formed integrally with the resin layer of the resin tube is provided to project farther outwardly than the metal pipe. Further, the outer peripheral surface of the metal pipe and the outer surface of the resin expanding portion are covered by the metal sleeve. When the resin tube is connected to the member which is to be connected, the sealing surface of the resin expanding portion is pressed against the contact surface of the member which is to be connected while a torque is applied to the metal sleeve. Thus, the gap between the contact surface of the member which is to be connected and the sealing surface of the resin expanding portion is sealed with the opening of the second flow path of the resin expanding portion and the flow-path hole of the member which is to be connected communicating with each other.

According to the above-mentioned configuration, the maximum length of the contact region where the resin expanding portion and the metal sleeve are in contact with each other in the axial direction is larger than the thickness of the resin layer in the radial direction. In this case, because the length of the resin expanding portion in the axial direction is large, the resin expanding portion is unlikely to be damaged even when a torsional torque is applied to the resin expanding portion. Further, because a large friction force is exerted between the resin expanding portion and the metal sleeve when a torque is applied to the metal sleeve, the resin expanding portion is firmly held with respect to the metal sleeve. This suppresses torsion of the resin tube. Further, because the outer surface of the resin expanding portion is held by the metal sleeve, even when a compressive force is applied to the resin expanding portion in the axial direction, the sealing surface is prevented from expanding outwardly in the radial direction. As a result, the resin tube is prevented from being damaged.

(Item 2) The resin tube connection device according to item 1, wherein the end surface of the metal sleeve may be located between the sealing surface and an end surface of the metal pipe in the axial direction, and the outer surface of the resin expanding portion may extend to the end surface of the metal pipe in the axial direction, and the maximum length of the contact region where the resin expanding portion and the metal sleeve are in contact with each other in the outer surface may be equivalent to a distance between the end surface of the metal sleeve and the end surface of the metal pipe in the axial direction.

With the resin tube connection device according to item 2, because the length of the resin expanding portion that projects from the end surface of the metal pipe in the axial direction is large, durability of the resin expanding portion can be improved.

(Item 3) The resin tube connection device according to item 2, wherein the resin expanding portion may be formed in a columnar shape having one end surface, another end surface and the outer surface, and the one end surface of the columnar shape may be the sealing surface, and the another surface of the columnar shape may come into contact with the end surface of the metal pipe in the axial direction.

With the resin tube connection device according to item 3, because the resin expanding portion has a columnar shape, durability of the resin expanding portion can be improved more sufficiently.

(Item 4) The resin tube connection device according to item 1, wherein an end surface of the metal sleeve may be formed to be flush with an end surface of the metal pipe, the end surface of the metal sleeve may have a recess, the resin expanding portion may include an end-surface covering portion formed on the end surface of the metal pipe and an end surface of the metal sleeve so as to project farther outwardly than the metal pipe in the radial direction, and a fitting portion that is formed integrally with the end-surface covering portion, has the outer surface and is fitted into the recess.

With the resin tube connection device according to item 4, because the fitting portion of the resin expanding portion is fitted to the recess of the metal sleeve, the resin expanding portion is reliably held by the metal sleeve. This suppresses torsion of the resin tube when a torque is applied to the metal sleeve. As a result, the resin tube is prevented from being damaged.

(Item 5) The resin tube connection device according to any one of items 1 to 4, wherein an area of an opening of the second flow path in the sealing surface of the resin expanding portion may be larger than a cross sectional area of the first flow path of the resin tube.

With the resin tube connection device according to item 5, when the sealing surface of the resin expanding portion is pressed against the contact surface of the member which is to be connected, the second flow path of the resin expanding portion is prevented from being closed.

(Item 6) A resin tube connection device according to another aspect connectable to a member which is to be connected and on which a contact surface having a flow-path hole is formed, may include a resin tube having a metal pipe, having a resin layer that is formed on an inner peripheral surface of the metal pipe and projects in an axial direction from an end surface of the metal pipe and having a flow path surrounded by the resin layer, a resin sealer that is joined to the resin layer so as to cover an outer peripheral surface of a portion of the resin layer projecting from the metal pipe, and a metal sleeve formed so as to cover an outer peripheral surface of the metal pipe and an outer surface of the resin sealer, wherein the resin sealer may have a sealing surface being able to come into contact with the contact surface and have an opening communicating with the flow path of the resin tube, the sealing surface may project farther than an end surface of the metal sleeve in the axial direction, and a maximum length of a contact region where the resin sealer and the metal sleeve come into contact with each other in the axial direction may be larger than a thickness of the resin layer in a radial direction.

With the resin tube connection device according to item 6, the resin sealer is bonded to the outer peripheral surface of a portion of the resin layer that projects from the metal pipe of the resin tube. Further, the outer peripheral surface of the metal pipe and the outer surface of the resin sealer are covered by the metal sleeve. When the resin tube is connected to the member which is to be connected, the sealing surface of the resin sealer is pressed against the contact surface of the member which is to be connected while a torque is applied to the metal sleeve. Thus, the gap between the contact surface of the member which is to be connected and the sealing surface of the resin sealer is sealed with the opening of the resin sealer and the flow-path hole of the member which is to be connected communicating with each other.

With the above-mentioned configuration, because the resin layer of the resin tube and the resin sealer are formed of resin, the resin sealer can be firmly bonded to the resin layer of the resin tube. Further, the maximum length of the contact region where the resin sealer and the metal sleeve are in contact with each other in the axial direction is larger than the thickness of the resin layer in the radial direction. In this case, because the length of the resin sealer in the axial direction is large, the resin sealer is unlikely to be damaged even when a torsional torque is applied to the resin sealer. Further, when a torque is applied to the metal sleeve, because a large friction force is exerted between the resin sealer and the metal sleeve, the outer surface of the resin sealer is firmly held by the metal sleeve. This suppresses torsion of the resin tube. Further, because the outer surface of the resin expanding portion is held by the metal sleeve, even when a compressive force is applied to the resin expanding portion in the axial direction, the sealing surface is prevented from expanding outwardly in the radial direction. As a result, the resin tube is prevented from being damaged.

(Item 7) The resin tube connection device according to item 6, wherein the resin sealer may be joined to an outer peripheral surface of the resin layer by welding.

With the resin tube connection device according to item 7, the resin sealer is more firmly bonded to the outer peripheral surface of the resin layer.

(Item 8) The resin tube connection device according to item 6 or 7, wherein an area of the opening in the sealing surface of the resin sealer may be larger than a cross sectional area of the flow path of the resin tube.

With the resin tube connection device according to item 8, when the sealing surface of the resin expanding portion is pressed against the contact surface of the member which is to be connected, the opening of the resin sealer is prevented from being closed.

(Item 9) The resin tube connection device according to any one of items 6 to 8, wherein the resin sealer may have a through hole extending in the axial direction, a portion of the resin layer projecting in the axial direction may be inserted into the through hole of the resin sealer, and an inner peripheral surface of the resin sealer may be joined to an outer peripheral surface of the resin layer, and the opening may be formed in the sealing surface by farther projection of the sealing surface of the resin sealer than an end surface of the resin layer in the axial direction.

With the resin tube connection device according to item 9, it is possible to easily fabricate the resin tube connection device by inserting the projecting portion of the resin layer of the resin tube into the through hole of the resin sealer and bonding the inner peripheral surface of the resin sealer to the outer peripheral surface of the resin layer.

The invention claimed is:
1. A resin tube connection device connectable to a member which is to be connected and on which a contact surface having a flow-path hole is formed, comprising:
   a resin tube having a metal pipe, having a resin layer formed on an inner peripheral surface of the metal pipe and having a first flow path surrounded by the resin layer;
   a resin expanding portion that is formed of a same material as that of the resin tube and is integrally formed with the resin tube, and is provided so as to project in an axial direction from an end of the resin layer and project farther outwardly than the metal pipe in a radial direction of the resin tube; and
   a metal sleeve formed so as to cover an outer peripheral surface of the metal pipe and an outer surface of the resin expanding portion, wherein the resin expanding portion has a sealing surface being able to come into contact with the contact surface and has a second flow path communicating with the first flow path of the resin tube and opening in the sealing surface,
   the sealing surface projects farther than an end surface of the metal sleeve in the axial direction, and
   the resin tube connection device is configured such that a maximum length of a contact region where the resin expanding portion and the metal sleeve are in contact with each other in the axial direction in the outer surface is larger than a thickness of the resin layer in the radial direction, so as to prevent the resin tube or the resin expanding portion from being damaged when a torsional torque is applied.

2. The resin tube connection device according to claim 1, wherein an area of an opening of the second flow path in the sealing surface of the resin expanding portion is larger than a cross sectional area of the first flow path of the resin tube.

3. A resin tube connection device connectable to a member which is to be connected and on which a contact surface having a flow-path hole is formed, comprising:
a resin tube having a metal pipe, having a resin layer formed on an inner peripheral surface of the metal pipe and having a first flow path surrounded by the resin layer;
a resin expanding portion that is formed of a same material as that of the resin tube and is integrally formed with the resin tube, and is provided so as to project in an axial direction from an end of the resin layer and project farther outwardly than the metal pipe in a radial direction of the resin tube; and
a metal sleeve formed so as to cover an outer peripheral surface of the metal pipe and an outer surface of the resin expanding portion, wherein
the resin expanding portion has a sealing surface being able to come into contact with the contact surface and has a second flow path communication with the first flow path of the resin tube and opening in the sealing surface,
the sealing surface projects farther than an end surface of the metal sleeve in the axial direction, and
a maximum length of a contact region where the resin expanding portion and the metal sleeve are in contact with each other in the axial direction in the outer surface is larger than a thickness of the resin layer in the radial direction,
the end surface of the metal sleeve is located between the sealing surface and an end surface of the metal pipe in the axial direction, and the outer surface of the resin expanding portion extends to the end surface of the metal pipe in the axial direction, and
the maximum length of the contact region where the resin expanding portion and the metal sleeve are in contact with each other in the outer surface is equivalent to a distance between the end surface of the metal sleeve and the end surface of the metal pipe in the axial direction.

4. The resin tube connection device according to claim 3, wherein
the resin expanding portion is formed in a columnar shape having one end surface, another end surface and the outer surface, and
the one end surface of the columnar shape is the sealing surface, and the another surface of the columnar shape comes into contact with the end surface of the metal pipe in the axial direction.

5. A resin tube connection device connectable to a member which is to be connected and on which a contact surface having a flow-path hole is formed, comprising:
a resin tube having a metal pipe, having a resin layer formed on an inner peripheral surface of the metal pipe and having a first flow path surrounded by the resin layer;
a resin expanding portion that is formed of a same material as that of the resin tube and is integrally formed with the resin tube, and is provided so as to project in an axial direction from an end of the resin layer and project farther outwardly than the metal pipe in a radial direction of the resin tube; and
a metal sleeve formed so as to cover an outer peripheral surface of the metal pipe and an outer surface of the resin expanding portion, wherein
the resin expanding portion has a sealing surface being able to come into contact with the contact surface and has a second flow path communication with the first flow path of the resin tube and opening in the sealing surface,
the sealing surface projects farther than an end surface of the metal sleeve in the axial direction, and
a maximum length of a contact region where the resin expanding portion and the metal sleeve are in contact with each other in the axial direction in the outer surface is larger than a thickness of the resin layer in the radial direction,
an end surface of the metal sleeve is formed to be flush with an end surface of the metal pipe,
the end surface of the metal sleeve has a recess,
the resin expanding portion includes
an end-surface covering portion formed on the end surface of the metal pipe and an end surface of the metal sleeve so as to project farther outwardly than the metal pipe in the radial direction, and
a fitting portion that is formed integrally with the end-surface covering portion, has the outer surface and is fitted into the recess.

6. A resin tube connection device connectable to a member which is to be connected and on which a contact surface having a flow-path hole is formed, comprising:
a resin tube having a metal pipe, having a resin layer that is formed on an inner peripheral surface of the metal pipe and projects in an axial direction from an end surface of the metal pipe and having a flow path surrounded by the resin layer;
a resin sealer that is joined to the resin layer so as to cover an outer peripheral surface of a portion of the resin layer projecting from the metal pipe; and
a metal sleeve formed so as to cover an outer peripheral surface of the metal pipe and an outer surface of the resin sealer, wherein
the resin sealer has a sealing surface being able to come into contact with the contact surface and has an opening communicating with the flow path of the resin tube,
the sealing surface projects farther than an end surface of the metal sleeve in the axial direction, and
the resin tube connection device is configured such that a maximum length of a contact region where the resin sealer and the metal sleeve come into contact with each other in the axial direction is larger than a thickness of the resin layer in a radial direction, so as to prevent the resin tube or the resin expanding portion from being damaged when a torsional torque is applied.

7. The resin tube connection device according to claim 6, wherein
the resin sealer is joined to an outer peripheral surface of the resin layer by welding.

8. The resin tube connection device according to claim 6, wherein
an area of the opening in the sealing surface of the resin sealer is larger than a cross sectional area of the flow path of the resin tube.

9. The resin tube connection device according to claim 6, wherein
the resin sealer has a through hole extending in the axial direction,
a portion of the resin layer projecting in the axial direction is inserted into the through hole of the resin sealer, and an inner peripheral surface of the resin sealer is joined to an outer peripheral surface of the resin layer, and the opening is formed in the sealing surface by farther projection of the sealing surface of the resin sealer than an end surface of the resin layer in the axial direction.

10. A resin tube connection device connectable to a member which is to be connected and on which a contact surface having a flow-path hole is formed, comprising:

a resin tube having a metal pipe, having a resin layer formed on an inner peripheral surface of the metal pipe and having a first flow path surrounded by the resin layer;

a resin expanding portion that is formed of a same material as that of the resin tube and is integrally formed with the resin tube, and is provided so as to project in an axial direction from an end of the resin layer and project farther outwardly than the metal pipe in a radial direction of the resin tube; and a metal sleeve formed so as to cover an outer peripheral surface of the metal pipe and an outer surface of the resin expanding portion, wherein the resin expanding portion has a sealing surface being able to come into contact with the contact surface and has a second flow path communication with the first flow path of the resin tube and opening in the sealing surface, the sealing surface projects farther than an end surface of the metal sleeve in the axial direction, and a maximum length of a contact region where the resin expanding portion and the metal sleeve are in contact with each other in the axial direction in the outer surface is larger than a thickness of the resin layer in the radial direction, the metal sleeve has a recess, and the contact region is a distance from an end surface of the metal sleeve to a bottom surface of the recess.

* * * * *